UNITED STATES PATENT OFFICE.

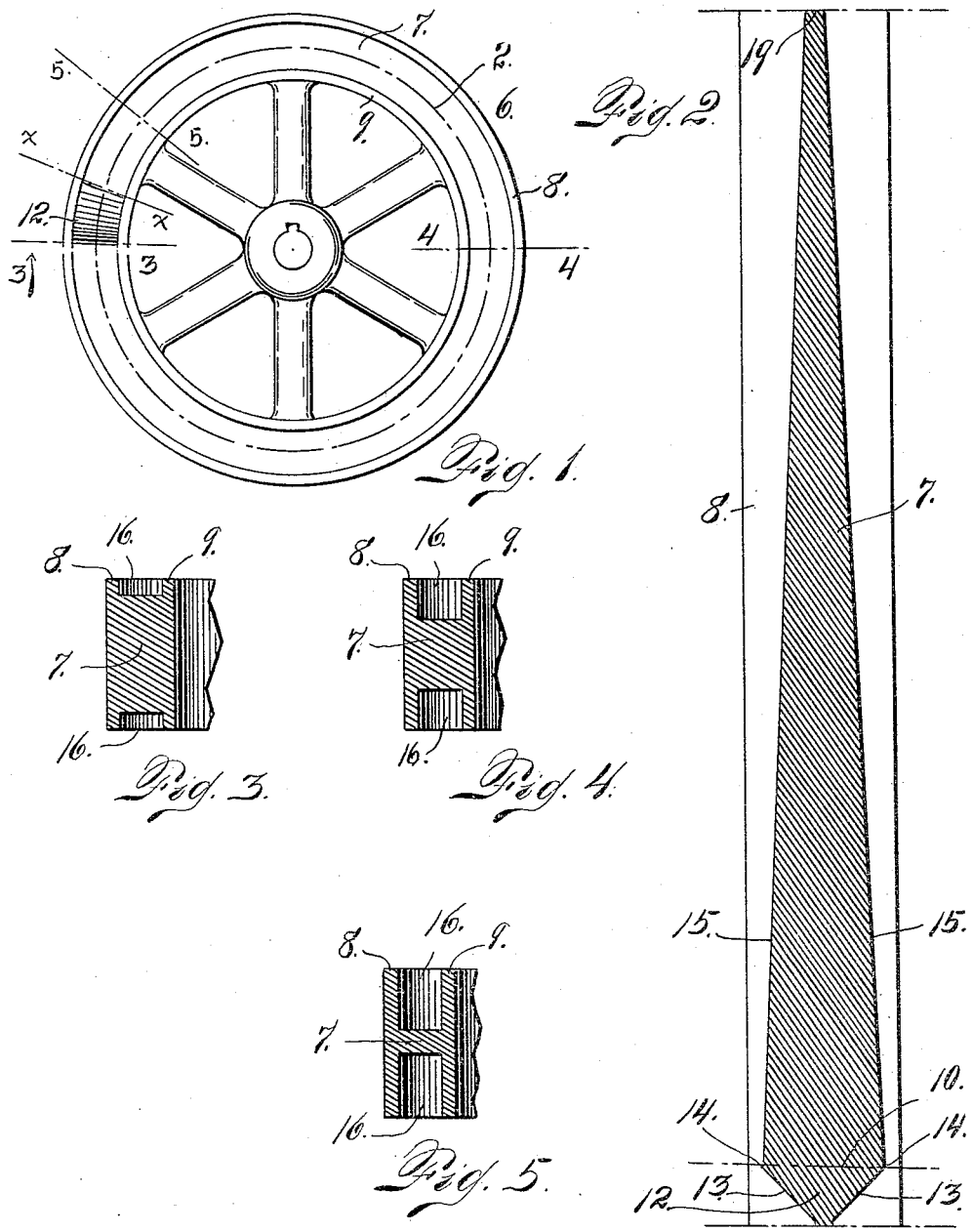

ULRICH OHLSEN, OF DENVER, COLORADO, ASSIGNOR OF ONE-HALF TO MARTIN MORTENSEN, OF DENVER, COLORADO.

COUNTERBALANCED WHEEL.

1,195,074.  Specification of Letters Patent.  Patented Aug. 15, 1916.

Application filed August 4, 1913. Serial No. 782,767.

*To all whom it may concern:*

Be it known that I, ULRICH OHLSEN, a citizen of the United States, residing at the city and county of Denver and State of Colorado, have invented certain new and useful Improvements in Counterbalanced Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in wheels which are out of balance except when in a predetermined position, my object being to provide a construction which, while efficiently performing the function of a wheel of this class, will at the same time, avoid some of the difficulties incident to the ordinary constructions.

In my present improvement, the rim of the wheel varies gradually in thickness circumferentially from a given point in both directions, in one direction the rim gradually increases in thickness, while in the opposite direction it gradually and uniformly diminishes in thickness. By virtue of this construction, the jerking action incident to a counterbalanced wheel of the construction heretofore in use is overcome.

In the drawing, forming a part of this application, I have illustrated one embodiment of my improvement, but it must be understood that other forms of construction may be employed without in any way departing from the spirit of the invention as set forth in the appended claim.

Having briefly outlined my improved construction, I will proceed to describe the same in detail, reference being made to the accompanying drawing, in which is illustrated an embodiment thereof.

In this drawing—Figure 1 is a side elevation of a wheel equipped with my improvement. Fig. 2 is a diagrammatic view showing the rim of the wheel as if it were straight, the same being sectioned on the dotted line 2. Figs. 3, 4 and 5 are sections taken respectively on the lines 3—3, 4—4, and 5—5, of Fig. 1.

The same reference characters indicate the same parts in all the views.

Let the numeral 6 designate a wheel in its entirety and in which my improvement is embodied. This wheel may be of any suitable construction except so far as my novel feature is concerned. In the embodiment of the invention illustrated, the rim of the wheel varies gradually and uniformly circumferentially from the transverse dotted line 3—3 to the similar dotted line $x$—$x$ of Fig. 1, the dotted line $x$—$x$ indicating the thinnest part of the rim and the dotted line 3—3, the thickest part thereof. The novel feature or peculiar construction of the wheel as illustrated in the drawing, is limited to the circular area 7 interposed between the inner and outer circumferential flanges 8 and 9 of the wheel, the said flanges extending transversely in both directions beyond the part 7 and being of uniform width entirely around the wheel. The area 7 between these flanges has a minimum thickness indicated at the extremity 19 of the part 7 of the rim as illustrated in Fig. 2 and a maximum thickness at the line 10, also indicated in Fig. 2. The thickness of the rim at 19 and 10 of Fig. 2 is the same as indicated by a section taken on the line $x$—$x$ of Fig. 1 and on the line 3—3 (see Fig. 3) of Fig. 1 respectively. The gradually varying mass of the rim between the thickest and thinnest parts is well illustrated in the sectioned part of Fig. 2. There is a short area of the rim between the lines $x$—$x$ and 3—3 which is abruptly beveled as shown at 12. This feature avoids a square shoulder where the thinnest and thickest parts of the rim merge into each other or at their junction. The inclined surfaces 13 of this beveled portion of the rim are of equal area and approach each other from points 14 where the surfaces 13 form oblique angles with the surfaces 15 of the portion of the rim which gradually and uniformly varies in thickness circumferentially as heretofore explained.

It is evident that by beveling the portion 12 of the rim as indicated in the drawing, the resistance or obstruction offered by the air to the rotation of the wheel when in use is greatly diminished as compared with a square or right-angled offset.

From the foregoing description, it will be understood that the space 16 between planes and coinciding with the outer edges of the flanges 8 and 9 and the part 7 of the wheel on opposite sides gradually increases in depth as the part 7 diminishes in thickness between the thickest and thinnest parts or terminals of the rim. This feature is well illustrated in Figs. 3, 4 and 5 and also in Fig. 2 of the drawing.

Having thus described my invention, what I claim is:

A wheel having a rim area constituting a circular wedge whose opposite sides are equally and uniformly inclined without interruption throughout their entire length, with the exception of a short part between the thickest and thinnest parts of the rim, which is abruptly beveled on opposite sides to form equal oblique angles with the meeting gradually inclined surfaces of the body of the wedge, the said rim area being bounded at its inner and outer circumferences by flanges, each of which is of uniform width through its entire length, and a space left between said flanges on opposite sides of the rim area, said space varying in depth without interruption, substantially throughout the circumference of the wheel.

In testimony whereof I affix my signature in presence of two witnesses.

ULRICH OHLSEN.

Witnesses:
ANNA L. LEHMAN,
OTTO E. HODDICK.

Copies of this patent may be obtained for five cents each, by addressing the "Commissioner of Patents, Washington, D. C."